(12) United States Patent
Aggarwal et al.

(10) Patent No.: US 7,013,286 B1
(45) Date of Patent: Mar. 14, 2006

(54) GENERATION, DISTRIBUTION, STORAGE, REDEMPTION, VALIDATION AND CLEARING OF ELECTRONIC COUPONS

(75) Inventors: Alok Aggarwal, Chappaqua, NY (US); Rahul Garg, Ghaziabad (IN); Parul Alok Mittal, New Delhi (IN); Natwar Modani, Jaipur (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/475,217

(22) Filed: Dec. 30, 1999

(51) Int. Cl.
 *G06F 17/60* (2006.01)
(52) U.S. Cl. ..................................... 705/14
(58) Field of Classification Search ............... 705/45, 705/14
 See application file for complete search history.

(56) References Cited

U.S. PATENT DOCUMENTS

| | | | |
|---|---|---|---|
| 5,185,695 A | 2/1993 | Pruchnicki | |
| 5,380,991 A | 1/1995 | Valencia et al. | |
| 5,420,606 A | 5/1995 | Begum et al. | |
| 5,502,636 A | 3/1996 | Clarke | |
| 5,727,153 A | 3/1998 | Powell | |
| 5,855,007 A | 12/1998 | Jovicic et al. | |
| 5,905,246 A | 5/1999 | Fajkowski | |
| 5,909,673 A * | 6/1999 | Gregory | 705/45 |
| 5,923,016 A | 7/1999 | Fredregill et al. | |
| 5,924,080 A | 7/1999 | Johnson | |

OTHER PUBLICATIONS

US 5,894,520, 04/1999, Nielsen (withdrawn)

* cited by examiner

*Primary Examiner*—James W. Myhre
(74) *Attorney, Agent, or Firm*—Whitham, Curtis & Christofferson, P.C.; Andrew P. Tennent (57) ABSTRACT

A method and system generates, distributes, stores, redeems, validates and clears electronic manufacturer coupons and electronic store coupons. A coupon mint generates unforgable blank digital coupons. The promoter of the offer then writes the terms and conditions and other details of the offer, on blank coupons to customize these. These customized coupons are digitally signed by the promoter and distributed to potential customers. A customer may either present these coupons electronically for redemption to an online store, or print these coupons and present them to a conventional offline store. The store may check the authenticity of a coupon by verifying the digital signature and also verifying if the coupon has not been used earlier by contacting a verification center. The store collects all redeemed coupons and sends these to manufacturer for clearing. The verification center verifies that the coupon is authentic and has not already been used before.

45 Claims, 5 Drawing Sheets

GENERATION, DISTRIBUTION, STORAGE, REDEMPTION, VALIDATION AND CLEARING OF ELECTRONIC COUPONS

BACKGROUND OF THE INVENTION

1. Field of the Invention

The present invention generally relates to electronic commerce (e-commerce) systems and, more particularly, to a method and system for generation, distribution, storage, redemption, validation and clearing of electronic coupons.

2. Background Description

Various sales promotion mechanisms exist like prizes, contest, sweepstakes, games, free samples, product warranties, tie-in promotions, loyalty points, cross-sell, up-sell, premium, memberships, card discounts and gift certificates. These have been used for a long time to retain loyal customers, to increase the repurchase rate of occasional, to attract new buyers, to manage inventory and to gain market. We refer to all these mechanisms and others such as instant discount which is similar to haggling or negotiations in the real world, as "coupons" in this invention.

With the advent of Internet shopping, the electronic equivalent of coupons have also come into existence. There are three types of models that are possible; coupons that are issued at an e-commerce site and redeemed at a physical store, those issued and redeemed at a single e-commerce site and others that are issued at one e-commerce site and redeemed at another e-commerce site. The most general electronic coupon generation, presentation, redemption and clearing system should allow a consumer to collect electronic coupons while doing online shopping, or otherwise visiting an e-commerce site, from various e-commerce sites and redeem these coupons online at any e-commerce site or physical store, satisfying the purchase conditions of the offer. The clearing between the issuing and redeeming e-commerce sites should also be electronic, whether off-line or online. The issuing e-commerce site is commonly referred to as the manufacturer and the redeeming e-commerce site is referred to as the retailer.

Various kinds of frauds are possible in an electronic coupon generation, presentation, redemption and clearing system such as double spending of electronic at same or different sites by the customer, tampering of electronic coupons to modify the validity period, discount amount or conditions by the customer, creation of a fake electronic coupon by the customer, trading of coupons between customers, duplication of electronic coupons by the retailer and claiming them from the manufacturer, retailer colluding with other retailers to exchange the list of redeemed coupons, tampering of electronic coupons by the retailer. These frauds often defeat the objective of targeting or limiting the number of coupons by the coupon issuer and also make it difficult for the coupon issuer to estimate coupon redemption rate or budget for a coupon campaign.

Most of the e-commerce sites like www.e-coupon.com, www.coolsavings.com, www.directcoupons.com, www.speciallinks.com, www.coupondirectory.com, etc., offer coupons on-line, as an image or a bar code, that the user can print on a local printer and use in a particular physical store. Many of these sites are actually third party coupon distributors, distributing coupons online on behalf of various merchants. Meals Online, www.meals.com, allows consumers to request online for delivery of coupon offers by mail, on answering a short questionnaire online. All these sites still require the customers to carry paper clippings of the coupons to a physical store, for redemption and do not target customers or limit coupon distribution. At one e-commerce site, www.supermarkets.com, the consumers can print the complete list of offers for physical supermarkets in the consumer's geographical location. At the checkout, the consumer can ask the cashier to scan the bar code at the top of the list. As the bar codes on the promotional items are scanned, it prompts the printing of "Web Bucks", which can be redeemed on subsequent visits to the store. The limitation with "Web Bucks" is that they are paper bucks in some sense, but can only be redeemed at the same store that issued the web bucks and work only for physical stores.

U.S. Pat. No. 5,420,606 to Begum et al. for "Instant Electronic Coupon Verification System" describes an instant electronic coupon verification system for a single physical store, where the store provides shoppers with an electronic device to view, select and store from a plurality of coupons and later redeem the coupon on reaching a checkout counter, based on items purchased. This is also limited only to physical stores and does not talk about any targeted coupon distribution.

The effectiveness of coupons can be greatly improved by targeting a specific profile of customers for coupons of specific products. Among targeted coupons, U.S. Pat. No. 5,502,636 to Clarke for "Personalized Coupon Generating and Processing System" proposes a personalized coupon generating and processing system which identifies a group of consumers that are likely to be responsive to coupons of predefined products and then distribute the coupons.

U.S. Pat. No. 5,909,673 to Gregory for "Method and System for Creating Site Specific Coupons at a Plurality of Remote Locations Which are Controlled by a Central Office" proposes a central server connected to multiple remote sites to allow the retailers to be able to customize discounts and coupon details according to the particular store location. A general coupon template is loaded onto the central server alone, with site specific information to be printed on each coupon. A particular remote processing station at a remote site can call in to the central server and download the general coupon template and the site specific information for that particular site. The remote processing station then combines the template with the site specific information and prints the site specific coupon. These inventions describe mechanisms only for generation of targeted coupons, without any mention of online coupon redemption, verification and clearing.

Various methods and systems have been proposed for electronic coupon generation, management and redemption at a single e-commerce site. U.S. Pat. No. 5,894,520 to Nielsen for "Method and System for Regulating Discounts on Merchandise Distributed Through Networked Computer Systems" describes a method and a system for regulating discounts on merchandise, at a vendor location, through networked computer systems. The system includes a user computer and a vendor computer connected via a network. when a user purchases a merchandise, the vendor issues an encrypted discount coupon for repurchase of the merchandise. When user desires to repurchase the merchandise, user sends a request to the vendor along with the encrypted coupon. The vendor verifies the coupon and gives the discount. An earlier paper by the authors (M. Kumar, A. Rangachari, A. Jhingran, and R. Mohan, "Sales Promotions on the Internet", *Third USENIX Workshop on Electronic Commerce*, Boston, 31 Aug.–3 Sep. 1998, pp. 167–176) describes a form of sales promotion for online merchants called e-coupons. A buyer need not print e-coupons as they can be captured electronically in an electronic coupon-wallet, and later redeemed electronically on the same on-line store. They solve the issue of targeted, limited online distribution and redemption of electronic coupons at a single online store, but it is not clear how they can handle coupons issued by a manufacturer which may get redeemed at any online store.

Several centralized service provider based systems have also been proposed for giving merchandise discounts. These systems do not issue any coupons to the customer, but just offer various discounts when the customer visits the retailer store for shopping. U.S. Pat. No. 5,185,695 to Pruchnicki for "Method and System for Handling Discount Coupons by Using Centrally Stored Manufacturer Coupons in Place of Paper Coupons" describes a method and system for handling discount coupons by using centrally stored manufacturer coupons in place of paper coupons, to save costs of printing and distributing and clearing paper coupons. The method and apparatus includes a central processor that receives information of product type, validation period and coupon value from manufacturers and produces a central coupon list of available coupon discounts. The central list is transmitted to retailers who produces a local coupon list based on the central list containing only those manufacturers and product type which the retailer holds for sale. The customer buys a product and as the product is moved through the checkout station, coupon discount, if any applicable, is deducted from the retail price. The central processor directly bills the manufacturer or transfers funds.

U.S. Pat. No. 5,924,080 to Johnson for "Computerized Discount Redemption System" describes a similar method of giving merchandise discounts by using a membership system comprising of a centralized system provider, multiple manufacturers, multiple merchants and multiple customers. But none of these systems are doing any targeted discounts; they are just giving discounts on the customer purchases without issuing any coupons to the customer at all, hence they do not describe any coupon distribution, redemption or verification mechanisms.

Another mechanism of giving merchandise discounts is in the form of transaction points. U.S. Pat. No. 5,923,016 to Fredregill et al. for "In-Store Points Redemption System & Method" describes a computer implemented consumer transaction point accumulation system in which a consumer earns and accumulates points immediately for immediate use during transactions at participating retailer outlets, wherein at each transaction, a customer's identification number is transmitted to. a central system which stores customer records including a customer balances of points accumulated to date. This does no targeting and is only limited to one form of coupons i.e. transaction points and is not a solution for a generic coupon that can be in the form of price-packs, cross-selling, gift certificates, and the like.

An e-commerce site, www.planetu.com, provides targeted offers that the consumer has the opportunity to select. After selecting their offers online, consumers receive them either by mail or redeem them at supermarkets with modem point-of-sale systems by swiping their frequent shopper card, the offers being automatically deducted at the point of sale. This system does targeted coupon distribution, but coupons can be redeemed only at physical retail shop. Besides, it requires the consumers to have a frequent shopper membership and the central server to maintain all coupon and consumer selection details.

Smart-card based coupon management and redemption systems have also been proposed such as U.S. Pat. No. 5,727,153 to Powell for "Retail Store Having a System of Receiving Electronic Coupon Information from a Portable Card and Sending the Received Coupon Information to Other Portable Cards" for single physical retail store, U.S. Pat. No. 5,905,246 to Fajkowski for "Method and Apparatus for Coupon Management and Redemption", and U.S. Pat. No. 5,380,991 to Valencia et al. for "Paperless Coupon Redemption System and Method Thereof" for targeted merchandise price markdown. The limitation of these systems is that they only talk about physical stores and the user has to carry a smart card.

An electronic coupon issuing, redemption, verification and clearing system, was proposed in the U.S. Pat. No. 5,855,007 to Jovicic et al. for "Electronic Coupon Communication System". This system comprises a first Internet node, an Internet coupon server and an Internet coupon notification center. The Internet coupon server generates a unique Internet coupon using a coupon generation process. The Internet coupon server accepts an on-line selection of one of the available unique Internet coupons from a user of the Internet node and transmits the coupon back to the user's printing device or e-mail storage. It then records the transaction in its coupon database and notifies the transaction to the Internet Coupon Notification Center. The Internet Coupon Notification Center subsequently records the transaction. Furthermore, a coupon redemption center can electronically verify coupon validity and record coupon redemption by communicating with the Internet Coupon Notification Center. It handles online targeting, generation, redemption and verification of electronic coupons between a manufacturer and a plurality of retailers, but it is not clear how it handles frauds such as a customer or a retailer colluding with the Notification Center or coupons from a plurality of manufacturers.

SUMMARY OF THE INVENTION

It is therefore an object of the present invention to provide a method and system for generation, distribution, storage, redemption, validation and clearing of electronic coupons.

According to the invention, there is provided a system for generation, distribution, storage, redemption, validation and clearing of electronic manufacturer coupons and electronic store coupons. A coupon mint generates unforgable blank digital coupons. The promoter of the offer then writes the terms and conditions and other details of the offer, on blank coupons to customize these. These customized coupons are digitally signed by the promoter and distributed to potential customers. A customer may either present these coupons electronically for redemption to an online store, or print these coupons and present them to a conventional offline store. The store may check the authenticity of a coupon by verifying the digital signature and also verifying if the coupon has not been used earlier by contacting a verification center. The store collects all redeemed coupons and sends these to manufacturer for clearing. The verification center verifies that the coupon is authentic and has not already been used before. This invention may be used for offering targeted or untargeted discounts on different products and services, offer different promotional schemes on different products, or combination of products, issuing and verifying gift certificates, maintaining loyalty points, electronically distributing prizes, contests, sweepstakes, games, free samples, product warranties, tie-in promotions, coupons of the. type buy x get y free, or buy x get $y off, buy x get $z off when you buy item y, cross selling, up-selling, premiums, memberships, card discounts and other similar sales.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

The system of the invention consists of a coupon mint, a manufacturer owned, hired or operated customization equipment and distribution agent, a coupon storage and coupon management equipment, coupon verification equipment and coupon verification center.

When a manufacturer decides to generate coupons, he or she asks a coupon mint to provide a certain number of blank, unforgable electronic coupons. The mint, on receiving this request, creates unforgable electronic coupons and delivers them to the manufacturer and stores information which identifies the coupons delivered to the manufacturer. The manufacturer then uses customization equipment to write the customization information on the coupons and also signs these coupons digitally. The distribution agent takes these customized and signed coupons and issues these to the potential customers. The customers may use these coupons immediately or may store the coupons for later use, say in their wallet. When the customer wants to buy a product or service for which the coupons are applicable, he or she may send these to the store that is selling the service or product. The store, which has verification equipment, receives the coupons and checks for validity by verifying the signatures on the coupon and also verifying locally verifiable conditions. Then the store sends the coupon (or a part of it) along with some additional information, like sales invoice number, to the verification center. The center responds with a "certificate of use" if the coupon was genuine and updates its database to reflect this authentication. The verification equipment decides the discount amount, possibly using the "certificate of use". The store sends these coupons and some optional additional information to the clearing house for consolidation and payment. The clearing house sorts these coupons and generates reports and sends the reports and coupons to the manufacturers. The manufacturer checks the transactions for authenticity and, on being satisfied, pays the money to the retailer either directly or through some intermediary.

Alternatively, the store can send the redeemed coupons directly to manufacturer. The manufacturer again checks the transactions for authenticity and on being satisfied, pays the money to the retailer either directly or through some intermediary.

A database of redeemed coupons may be used by the manufacturers to build customer profiles for future targeting.

This invention may be used for offering targeted or untargeted discounts on different products and services, offer different promotional schemes on different products, or combination of products, issuing and verifying gift certificates, maintaining loyalty points, electronically distributing prizes, contest, sweepstakes, games, free samples, product warranties, tie-in promotions, coupons of the type buy x get y free, or buy x get $y off, buy x get $z off y etc., cross selling, up-selling, premiums, memberships, card discounts etc.

APPARATUS

Figure 1:
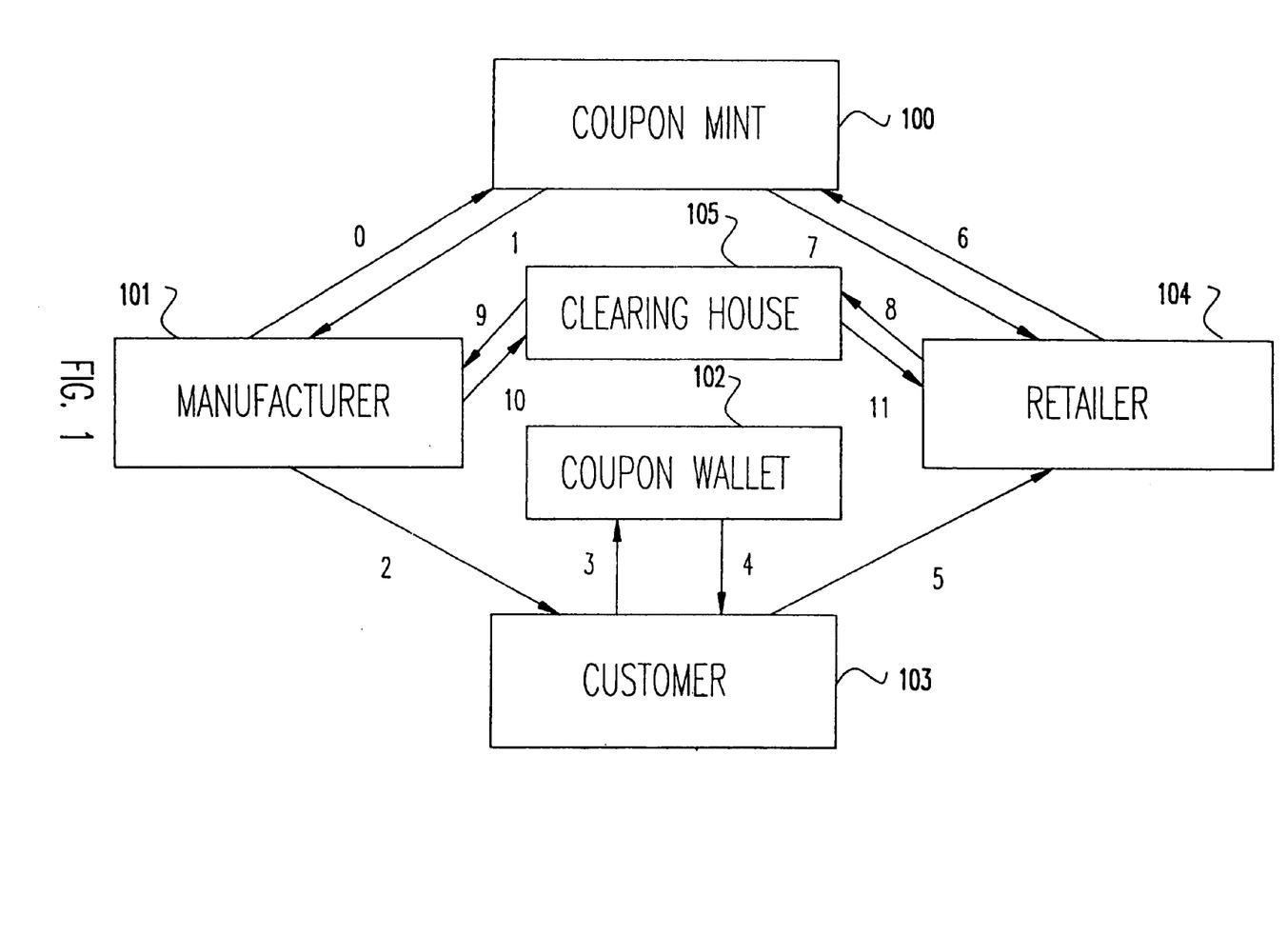
FIG. 1 is a block diagram showing the architecture for manufacturing coupons with a coupon wallet and clearing house.

Referring now to the drawings, and more particularly to FIG. 1, we describe the architecture and event sequence for our invention. The end-to-end system consists of a coupon mint 100, a customization agent and a distribution agent owned by the manufacturer 101 or his or her agent, a wallet 102 owned or hired by a customer 103, a verification agent owned by a retailer 104 or his or her agent and a coupon clearing house 105. The coupon mint 100 also plays the role of verification center. The objective is to issue manufacturer discount coupons for a product or a category of products or a service or a category of services, that can be redeemed at plurality of retail stores (possibly online). A further objective is to ensure that the coupons can not be forged or used more than a predefined number of times (usually once).

The request to the coupon mint 100 from the manufacturer 101 consists of the number of coupons required and an optional class identifier. The unforgable blank coupon generated by the coupon mint 100 consists of a unique identifier for the coupon, the class identifier if supplied by the manufacturer 101, a cryptographic pattern derived from the class identifier and the unique identifier for the coupon and some other information as applicable. The coupon has the following properties:

When the coupon is presented to the mint at a later stage, the mint can recognize that the coupon was indeed produced by the mint.

No other entity can produce such a stream of bytes, that will be recognized by the mint as a valid coupon, within a reasonable probability.

The customization equipment, usually owned or operated by the manufacturer of product or the manufacturer's agent doing sales promotion on behalf of the manufacturer. Typically, the equipment requests the coupon mint for a certain number of coupons of a given class. It then obtains the required number of unforgable blank electronic coupons from the coupon mint either through a communication network or through other medium, e.g., floppy disks or magnetic tapes. The customization equipment then writes the offer specific information on blank coupon and digitally signs the coupon to make it an authentic certificate. The offer specific information includes promotion specific information. It may contain personalized information and may also contain verification instructions.

The promotion specific information may include the following information:

Information describing some discounted product or service. In case of a product, a universal product code (UPC) may be used to identify the product. A similar appropriate identification may be used in case of a discounted service. The information may alternatively identify a group of products and/or services; e.g., discounts on all products/services of a specified brand. There may be more than one product information on the coupon, i.e., the discount is applicable only if the customer purchases all the products specified. For instance, promotions, e.g., buy a computer and get 50% on a table, or buy one and get another free.

Information describing the amount of discount offered. This information may either be written explicitly in terms of percentage that is discounted or the actual amount of discount, or it is described in the form of a mathematical or logical expression. This expression may be evaluated later by the verification equipment that also computes the amount of discount.

Optional information, including validity periods. For example, a pizza shop may give discount coupons that are only applicable on Tuesdays. Similarly, there may be weather related coupons or seasonal coupons, e.g., coupons that are valid in post Christmas season or in the season between Halloween and Thanksgiving, etc. Any other information describing terms and conditions of the offer. Some offers may be applicable only if the customer buys all the products or services listed, some offers may require purchase of just one product or service listed, and yet some other offers may require purchase of V out of W listed products or services. Similarly some offers may require the customer to spend a minimum specified amount of money on specified products. Alternatively, there may be offers requiring the customer to collect a set of coupons satisfying a specified condition. The offer is applicable only if the customer presents a set of coupons satisfying the specified condition. Some representative examples are:

1. Loyalty points: each coupon contains some loyalty points. The offer is given when a customer presents coupons totaling a specified number.
2. Each coupon contains a letter of English alphabet. Offer given when a customer presents coupons making a specified-word. The sample terms and conditions described above are not exhaustive. A number of other terms and conditions may be devised such as the customer need to collect pictures of at least 12 elephants, 14 snakes and 20 flowers to avail the offer, wherein each picture is provided in a prespecified manner.

The personalization information consists of the information describing the intended recipient of the product or the service. In case the coupon is targeted to a specific customer, then his or her name, credit card number, driver's license number, social security number or any other form of identification may be used for identification purposes. Sometimes it is not desirable to put this information explicitly on the coupon. In this case, a hash function of this information may be put on the coupon. (A hash function maps a sequence of bytes to another sequence of bytes, wherein the second sequence of bytes is usually smaller (in length) than the first one.) A plurality of the above conditions may be used for customer identification. In case the promotion is targeted to a class of users, other identification parameters like the city of residence, his or her Internet service provider (ISP), or the brand of computer/software owned by him or her may be used. A coupon containing a personalization information is valid for use only by the customer or class of customers described.

Coupon verification instructions describe the address, medium and protocols to carry out on-line verification of coupon. The medium could be the Internet, telephone network, a private network, or any communication medium and manual verification in the extreme case. The protocol could be one of the well-known Internet protocols or it could be a specific protocol designed or used for the purpose. Similarly, the address could be a Universal Resource Locator (URL) in case of the Internet, telephone number in case of telephone network, or any means to identify the said verification service over the communication medium.

The coupon may also contain a lucid description of the offer in form of text, images, audio, video, or any multimedia electronic document format. A distribution agent which distributes the coupons electronically. Depending on customer profile and promotion policies, the agent makes a customized coupon for a user and presents it to the user (who may decide to use it immediately or store it for future use). The agent uses the customization equipment to customize the coupon. The presentation of the offer to a user may be either done on occurrence of an event, e.g., a purchase of a product on an on-line store, visiting a particular product page a number of times, clicking on a banner advertisement etc. or as a routine promotional exercise. Alternatively the coupons may be distributed by other mediums like mass e-mail etc. or by packaging it inside a digital good or service, etc.

The wallet where the customer electronically stores the coupons received by him or her may reside on his or her hard disk or other kind of memory (including cassettes, RAM, and WROM) or it may be managed by the coupon issuer or it may be offered as a service by a third party service provider.

The coupon verification equipment, usually owned by the retailer, which verifies the authenticity of the coupon and optionally obtains a "certificate of use" as described in the following steps: First, it verifies the digital signature on the coupon. Second, it checks (with or without the help of a human) if the terms of the offer are valid, i.e., the coupon is not expired, the intended customer has made the intended purchases, other terms of the offer are valid etc. Third, it sends a part of the coupon or the full coupon to a verification center. It may also send some additional information related to the transaction like the transaction identifier, invoice number, or a proof of purchase etc. to the verification center. If the coupon contains the verification instructions, the address of the verification center is obtained from the coupon, otherwise a default address is used. Fourth, the verification equipment then obtains a "certificate of use" from the verification center corresponding to the coupons sent. In the simplest embodiment, the discount information is explicitly written on the coupon, and the verification equipment only need to check if the coupon has been used earlier. This can be done from the information present in the certificate of use. Otherwise, the mathematical or logical expression written on the coupon need to be evaluated on parameters contained in the certificate of use to compute the discount amount. This is required for complex coupon types like random value coupons, early bird coupons, aging coupons, etc.

The coupon verification center accepts a blank coupon or portions of a customized coupon and some optional additional information, like proof of purchase, invoice number etc., and checks the following:

a. If the coupon was issued by the coupon mint. This may be done by checking if the cryptographic pattern is correct.
b. If the coupon is still valid. In one embodiment, the term valid implies that the coupon has not already been redeemed. This may be done by maintaining a database of redeemed coupons. If the coupon is valid, it issues a "certificate of use", that contains the following information:
   1. Number of coupons of the same class already redeemed. This information may be used to compute the discount amount in case of early bird coupons. This information is optional.
2. Number of times this coupon has been already redeemed. This information may be used to check if the coupon has been redeemed before.
3. The time at which this certificate of use is being issued. This information may be used to compute discount amount in case of aging coupons. This information is optional.
4. A random number. This number may be used by the verification equipment to compute discount amount in case of random value coupons. This information is optional.
5. The address of verification equipment. This information is optional.
6. The additional information supplied by the verification equipment. The verification center updates its database of redeemed coupons.

Optionally, a clearing house, which provides a single point interface to the retailers to consolidate coupons from different manufacturers may be a part of the system. The retailers send coupons along with their certificate of use and other relevant information like proof of sale or sales invoice number to the clearing house. The clearing house first verifies the authenticity of coupons and corresponding certificate of use. It then sorts the coupons by retailers and manufacturers and generates reports along with sorted coupon lists to transfer the required amount from manufacturer to the retailer.

In one embodiment of the invention, a customer navigates the world wide web (WWW) or an electronic marketplace using his or her electronic device (including a personal computer (PC), a cellular phone, a personal digital assistant (PDA), a TV, or other information appliance), which has a display device and an input device, and optionally storage and printing devices. Based on user profile and promotion policies, a distribution agent residing on the web site or the marketplace presents the customer a potential offer which is displayed on his or her screen. The customer may decide to explore the offer further, say by clicking on the banner advertisement. After completing the prerequisites of the offer, such as filling in the registration information, or making some purchases, etc., he or she is presented with actual coupon. After the presentation of the coupon, the customer may decide to use it immediately by making the required purchase, or decide to keep it for future use. In the latter case, a customized coupon of the offer is issued to the customer which he or she stores in his or her coupon wallet. At a later stage, the customer may use the coupon by making a purchase over the communication network. The customer navigates the world wide web or browses through an electronic marketplace using his or her terminal and makes a selection of items he or she intends to purchase. After selecting the desired items, the customer presents the coupons stored in his or her wallet to the online retailer who verifies the coupons using the verification equipment and gives the discount to the customer. The retailer stores all the redeemed coupons along with their certificate of valid use and other relevant information in the retailer's database. At a later stage, the retailer sends all these redeemed coupons and certificates of use to the clearing house or to the respective manufacturers and gets the required amount from various manufacturers. The manufacturers may maintain a database of redeemed coupons to build customer profiles for future targeting.

In another embodiment of this invention, the customer obtains electronic coupons and at a later stage he or she generates a printout of the coupons, using printing device attached to his or her terminal. The printed coupon may contain images to make it look appealing and textual description of the offer in human readable format and the coupon of offer in machine readable form like bar codes or text which can be read by an optical character reader (OCR) device. The customer then physically takes the printed coupon to the retailer where the coupon verification equipment reads the information using the bar code reader or OCR or by manual entry and offers the intended discount to the customer if all the conditions are satisfied.

In another embodiment, the customer obtains electronic coupons and at a later stage, he or she downloads the electronic coupon in a portable device such as floppy disk, magnetic tape, compact disk, personal digital assistant, portable smart-card, cellular phone, etc., and takes the portable device to a retailer where the coupon verification equipment reads the electronic coupon from the portable device either using a wired communication channel or a wireless channel. The verification equipment then checks the validity of the coupon. If the coupon is valid, the retailer gives the intended discount to the customer.

In another embodiment, the coupon mint writes the verification instructions on the blank coupon before handing it out to a customization equipment.

As mentioned, the coupon wallet is stored and managed by a third party wallet service provider. In another embodiment, the coupon wallet is managed by the coupon issuer.

In another embodiment, the retailers directly send the redeemed coupons and their certificates of valid use to respective manufacturers for clearing.

In another embodiment, the verification center and the coupon mint are operated by the same service provider.

In another embodiment, the customization of coupons is done in more than one step as follows. The manufacturer of a product or promoter of a service first writes some information, like the discount offered, on the coupon and signs it using his/her private key. In the next stage, the distribution agent writes other customized information like part of the personalized information on the coupon and digitally signs it using the agent's private key. The coupon may pass through a number of such agents, each of which write some customized information, and is finally handed out to a potential customer. The verification equipment checks all the digital signatures in this case.

In another embodiment, the present invention may be used for store specific coupons. In this case the coupon-mint and the customization equipment are owned and operated by the store. There is no clearing required in this case as the store does not need to get any payment from manufacturers for redeemed coupons.

In other embodiments of this invention, some or all of the messages exchanged between entities mentioned above, are encrypted.

In another embodiment, the customization equipment, the coupon mint, and the coupon wallet are operated by the same service provider, which also performs the role of distribution agent and the clearing house.

In other embodiments of this invention, any combination of equipments described above may be operated by different service providers.

In another embodiment, the present invention may be used for implementing "early bird coupons". The class identifier of the coupon is used to identify all the early bird coupons in a specific promotion scheme. The discount information in the coupon contains a number "n", in addition to the discount amount. This number indicates that only the first n coupons of this class will be redeemed. The discount amount for these coupons is applicable only if the number of times the coupons of this class have been redeemed (as given by the "certificate of use") is less than mentioned in the coupon (i.e., "n"). Otherwise, the shopper receives no discount.

In another embodiment, the present invention may be used for implementing "multiple times redeemable coupons". Here, the discount information in the coupon contains a number "m", in addition to the discount amount. This number indicates that this coupon can be redeemed up to m times. The discount amount for this coupon is applicable only if the number of times this coupon has been redeemed (as given by "certificate of use") is less than mentioned in the coupon (i.e., "m"). Otherwise, the shopper receives no discount.

In another embodiment, the present invention may be used for implementing "aging coupons". The term "aging coupons" implies that the discount amount depends on the time at which the coupon was redeemed. Here the customization equipment writes the discount information in terms of a mathematical expression that depends on the time at which the mint issues the "certificate of use", or a table that indicates discount amount for various time periods. The verification equipment calculates the discount amount using the mathematical expression given in the coupon and the time-stamp given by the coupon mint in the "certificate of use". Alternatively, it uses the table provided in coupon and the time-stamp given by the coupon mint in the "certificate of use" to calculate the discount amount.

In another embodiment, the present invention may be used for implementing "random value coupons". The term "random value coupon" implies that the discount amount for the coupon is random (i.e., it is not known or fixed at the time of customization). Here, the range of discounts may be mentioned, but the exact value of the discount is not mentioned. The customization equipment writes the discount information in terms of a mathematical expression that takes a random number as a parameter. The verification equipment calculates the discount amount using the mathematical expression given in the coupon and the random number supplied by the mint as a part of the "certificate of use".

In other embodiments, present invention may be used for offering targeted or untargeted discounts on different products and services, offer different promotional schemes on different products, or combination of products, issuing and verifying gift certificates, maintaining loyalty points, electronically distributing prizes, contest, sweepstakes, games, free samples, product warranties, mail-in rebates, tie-in promotions, coupons of the type buy x get y free, or buy x get $y off, buy x get $z off y etc., cross selling, up-selling, premiums, memberships, card discounts, etc.

In other embodiments of our invention, the coupon may be targeted or untargeted, may be generated due to some action by the user or generated as a result of a targeted promotion scheme or for clearing the inventory. For targeted promotions, data-mining techniques may be used for profiling the customers. Also the coupon may be offered to the customers for free, or they may be priced. The coupon may require the customer to answer questions or write slogans. The coupon may also be specified as valid only for the current session (called the "session coupons"). The coupon generated on the purchase of some item may be applicable for similar items, or for a different type of items. The listed given above is only suggestive and is by no means restricted to the classes described above. The present invention is generic enough to support all the classes mentioned above and may be used for others types of coupons as well.

Figure 2:
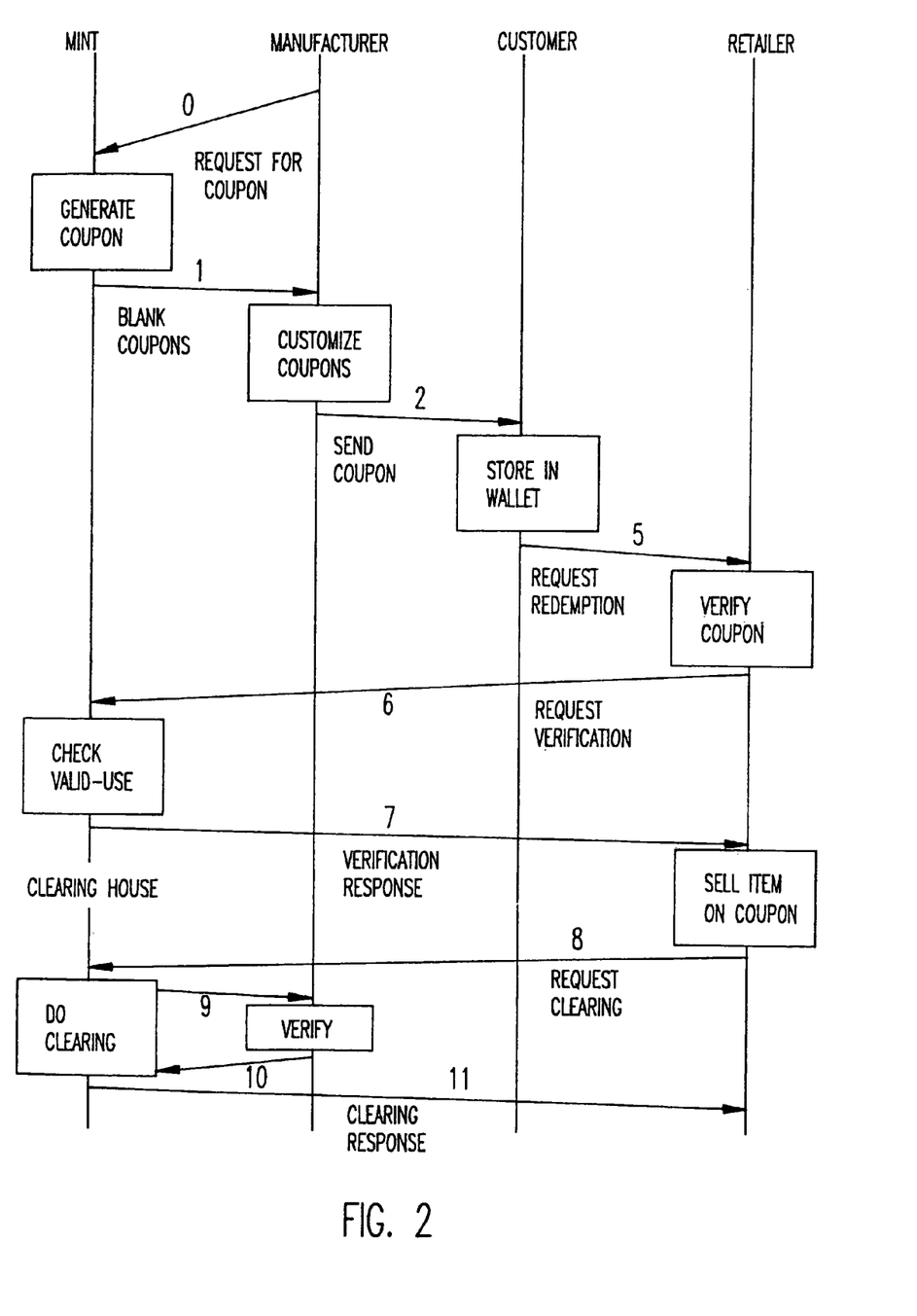
FIG. 2 is a timing diagram for the electronic manufacturer coupon life-cycle.

Referring next to FIG. 2 with continued reference to FIG. 1, there is now described the sequence of the events that takes place. The events, or messages, are numbered 0 to 11 in FIGS. 1 and 2. First, the manufacturer 101 decides when he or she wants to generate coupons and how many. This decision may be taken based on profiling of users (using data-mining techniques) or for need of clearing the inventory or as a routine promotional campaign. The manufacturer passes on this information to the coupon mint 100 (message 0). The coupon mint 100 responds by providing the manufacturer 101 a set of unforgable coupons (message 1). At this stage, these coupons contain identifiers that can identify the coupon uniquely. Also, they contain a number which is a undisclosed one-way function of the identifier. Now this pair of numbers ensures that no other person can make a coupon that will pass as a coupon generated by this mint. Examples of such a functions are one-way hashing functions and secret key encryption techniques. Let us denote the identifier and its function by x and $f(x)$. Alternatively, the coupon may have the coupon identifier and a digital watermark or some other cryptographic pattern that depends on the coupon identifier.

The manufacturer 101 decides to whom to give the coupons based either on some profiling (using data-mining technique) or based on some event (possibly generated due to some user action). The manufacturer 101 customizes the coupon by writing information on the coupon regarding the product(s) for which this coupon is valid, the expiry date (or validity period), the manufacturer's name or some other identifier or some characteristics, the amount or percentage of discount, the instruction for verification, etc. The verification instruction can alternatively be written by the coupon mint 100. The verification instructions may include the locator for the verification center, the protocol to be used (e.g., http/post) etc. Then the manufacturer 101 digitally signs the coupon and sends it to the customer 103 (message 2). One example of digital signatures is RSA (Revist, Shamir and Adelman) public key/private key algorithm. The customer 103 may store the coupon in his or her wallet 102 (message 3), which may reside at the customer end or may reside on a third party service provider's equipment.

The customer 103 goes to a retailer 104 for buying some products. When he or she decides to buy a particular product, he or she also finds out whether he or she has a coupon valid for this product. The retailer 104 may help the customer 103 in deciding what coupon(s) to use if the customer provides sufficient information for the retailer to ascertain what coupons he or she has. The customer 103 now retrieves the coupon from the wallet 102 (message 4) and sends this coupon to the retailer 104 (message 5). In case the wallet 102 of the customer 103 is on his or her own machine, messages 3 and 4 are implicit.

The retailer 104, after receiving the coupon, verifies the coupon for forgery. If the signature of the manufacturer 101 is valid and the date of expiry is not yet over and the customer who has presented the coupon matches the description given on the coupon, the retailer 104 sends a message to the coupon mint 100 to authorize the use of this coupon (message 6). This message contains the coupon identifier and the random number (or any other cryptographic pattern as applicable) that was generated by the mint 100. This step is required to ensure that the coupon is not redeemed more often then intended by the manufacturer and also to ensure that this coupon was indeed issued by the mint.

The coupon mint 100 checks that the pair of numbers received is indeed a matching pair and it also finds out from its database that how many times this coupon has been used, as well as, how many coupons of this class have been used, and the time of creation of this "certificate of use". The mint 100 sends this information in "the certificate of use" to the verification equipment, as well as a random number. The response of the mint also contains the coupon identifier for which this certificate was issued and is signed by the mint (message 7).

The retailer 104 receives the response of the coupon mint 100 and accordingly decides to honor or not honor the coupon. If the retailer decides to honor the coupon, the retailer collects the coupon from the customer and gives him or her the mentioned discount.

The retailer 104 now can send this coupon, along with transaction identifications, to the clearing house 105 for clearing, either immediately or later on, after periodic intervals (message 8). The clearing house 105 consolidates the coupons received from various retailers and sends them to the manufacturer (message 9). The manufacturer 101 confirms that the transactions are legitimate by checking the sign of the mint on the transaction identifier. If the manufacturer 101 is satisfied, the manufacturer sends a confirmation message, possibly along with money, to the clearing house 105 (message 10). The clearing house 105 sorts this information and prepares retailer-wise reports and sends those to the respective retailers (message 11).

Alternatively, the clearing house 105 may not be present. In that case, the retailer 104 sends the coupons and the transaction identifications to the manufacturer 101 directly. The manufacturer 101 confirms that the transactions are legitimate by checking the sign of the mint on the transaction identifier. If the manufacturer is satisfied, the manufacturer sends a confirmation message, possibly along with money, to the retailer. Alternatively, the manufacturer can just credit the money to the account of the retailer for future use.

In the embodiment where the system issues "early bird coupons", the request for coupons (message 0) contains a class identifier. Information about the class identifier is embedded into the coupon identifier (message 1). The customization equipment mentions that this coupon is an "early bird coupon" and the number of coupons that will be redeemed for this class, along with other information, on the coupon. The distribution agent gives this coupon to the customer. When the retailer 104 receives an "early bird coupon" from a customer 103, the retailer sends it to the verification center. The verification center includes information about how many coupons of this class have been redeemed earlier on the "certificate of use". The verification center also updates its database. When the retailer 104 (using its verification equipment) receives the "certificate of use" from the mint 100, it checks the number given by the mint to see if it is smaller than given in the terms and conditions on the coupon to find whether this coupon is eligible to receive the discount. The retailer 104 accordingly decides to offer the discount to the customer.

In the embodiment where the system issues "random value coupons", the customization equipment identifies this coupon as a "random value coupon" and includes the expression to calculate the discount amount, that takes a random number as an input, along with other information, on the coupon. The distribution agent gives this coupon to the customer. When the retailer 104 receives a "random value coupon" from a customer 102, the retailer sends it to the verification center. The verification center includes a random number on the "certificate of use", among other things. When the retailer 104 receives the "certificate of use" from the mint 100, it takes the random number given by the mint and calculates the discount amount using the expression provided in the coupon and accordingly offers the discount to the customer.

In the embodiment where the system issues "aging coupons", the customization equipment identifies this coupon as an "aging coupon" and includes the expression to calculate the discount amount, that takes a time-stamp, as an input, along with other information, on the coupon. The distribution agent gives this coupon to the customer 102. When the retailer 104 receives an "aging coupon" from a customer, the retailer sends it to the verification center. The verification center includes the time-stamp of the time when it prepares the "certificate of use" on it, among other things. When the retailer 104 receives the "certificate of use" from the mint, it takes the time-stamp given by the mint and calculates the discount amount using the expression provided in the coupon and accordingly offers the discount to the customer.

Figure 3:
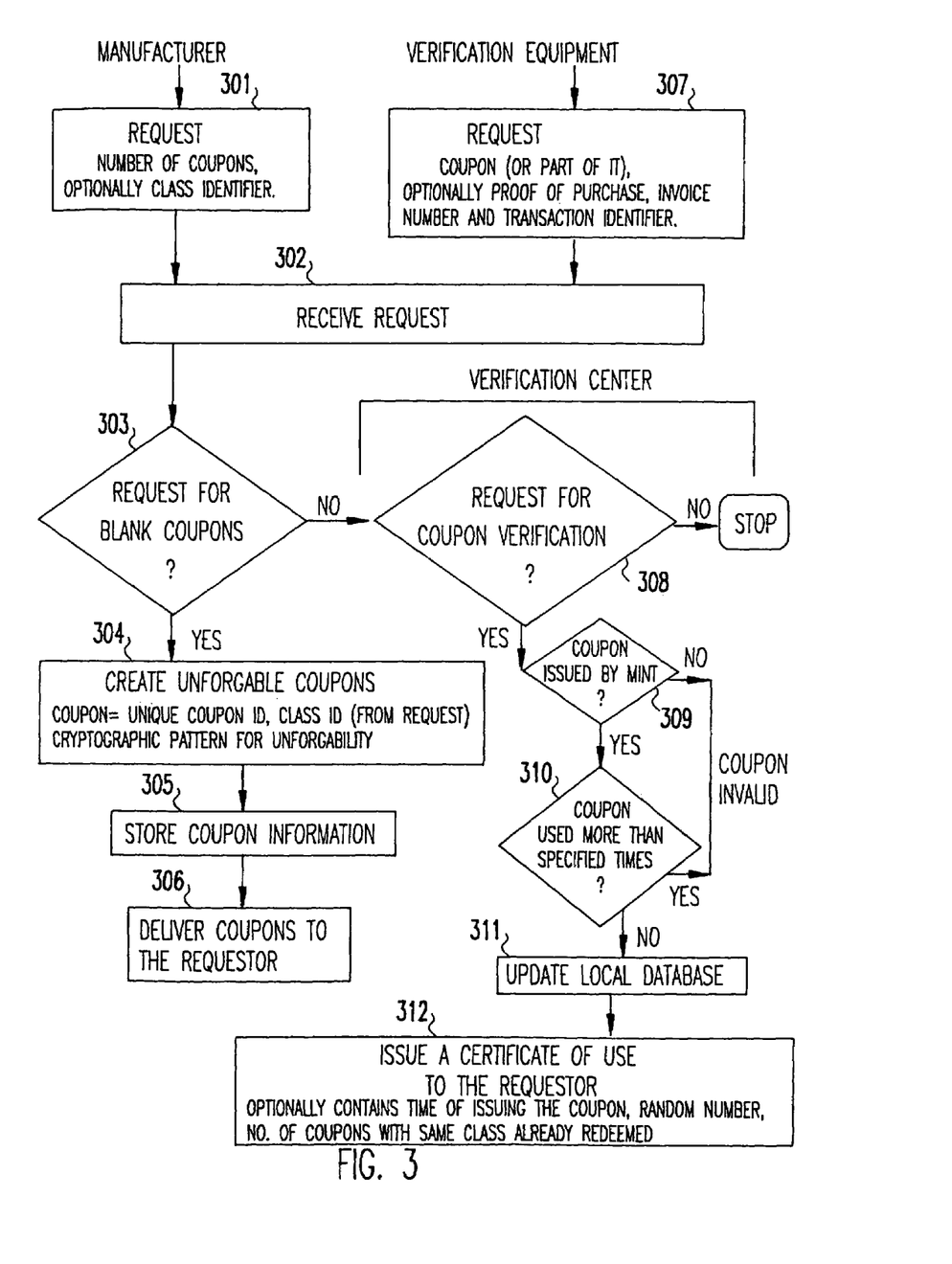
FIG. 3 is a flow diagram showing the logic of a computer implementation of the coupon mint.

The coupon mint is preferably implemented in computer software. With reference to FIG. 3, consider first the receipt of a request from a manufacturer. The request is received at input block 301 and includes the number of coupons requested and, optionally, a class identifier. The received request is routed at block 302 to decision block 303 where a determination is made that the request is for blank coupons. Unforgable coupons are created in function block 304. Each coupon is given a unique coupon identification (ID), class ID (from the manufacturer's request), and a cryptographic pattern for unforgability. The coupon information is then stored in a secure store in function block 305, and then the coupons are delivered to the requester in function block 306.

Figure 4:
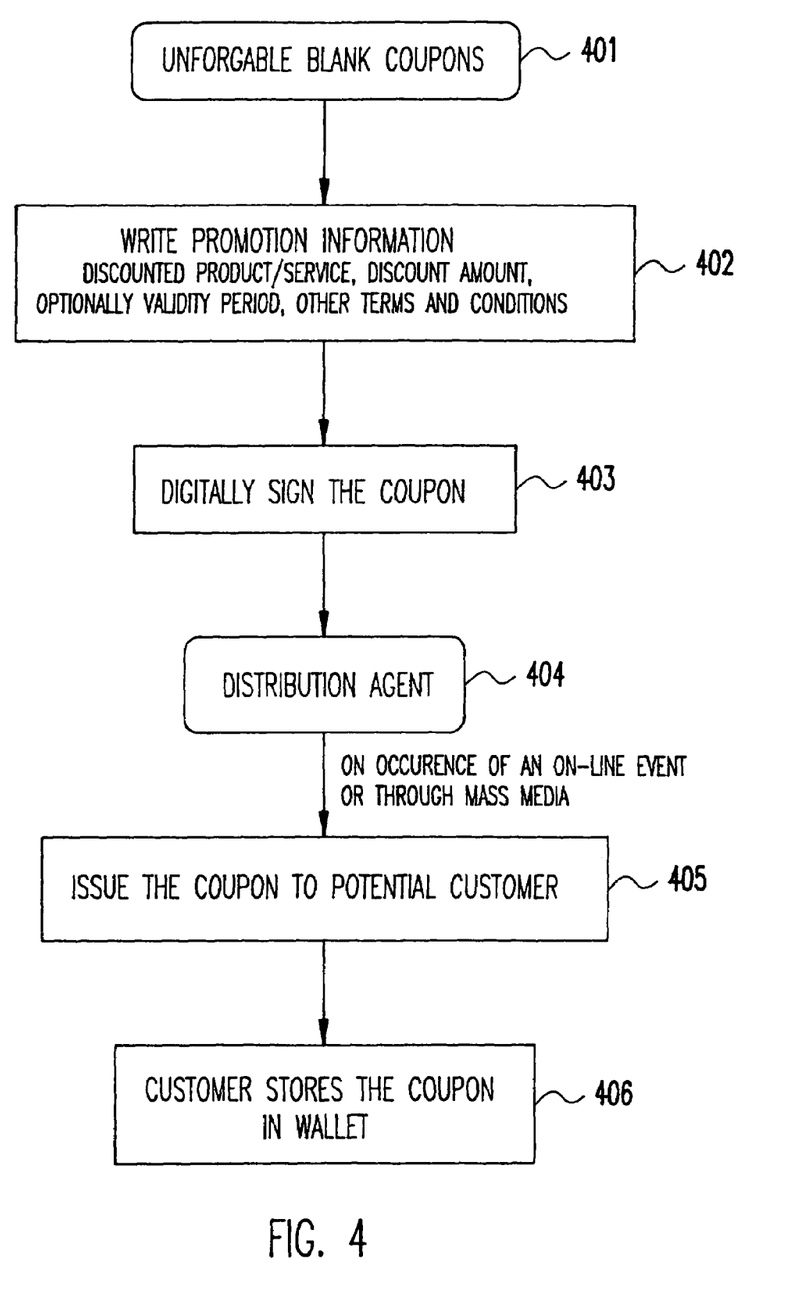
FIG. 4 is a flow diagram showing the logic of a computer implementation of the customization equipment.

Once the coupons have been delivered to the requester, the coupons are customized. The preferred implementation of the customization equipment is computer software as shown in FIG. 4. The unforgable blank coupons are received at input block 401. Then, in function block 402, promotion information is written on the coupons. This information may include a discounted product or service, a discount amount and, optionally, a validity period or other terms and conditions. The manufacturer then digitally signs the coupon in function block 403. Once the coupons have been customized and signed, they are delivered to a distribution agent in output block 404. On the occurrence of an on-line event or through mass media, the distribution agent issues a coupon to a potential customer in function block 405. The customer may redeem the coupon as described above, or the customer may store the coupon in his or her wallet in function block 406. As mentioned, the customer's wallet may be a storage location on the hard drive of the customer's computer or it may be a storage device maintained by a third party.

Figure 5:
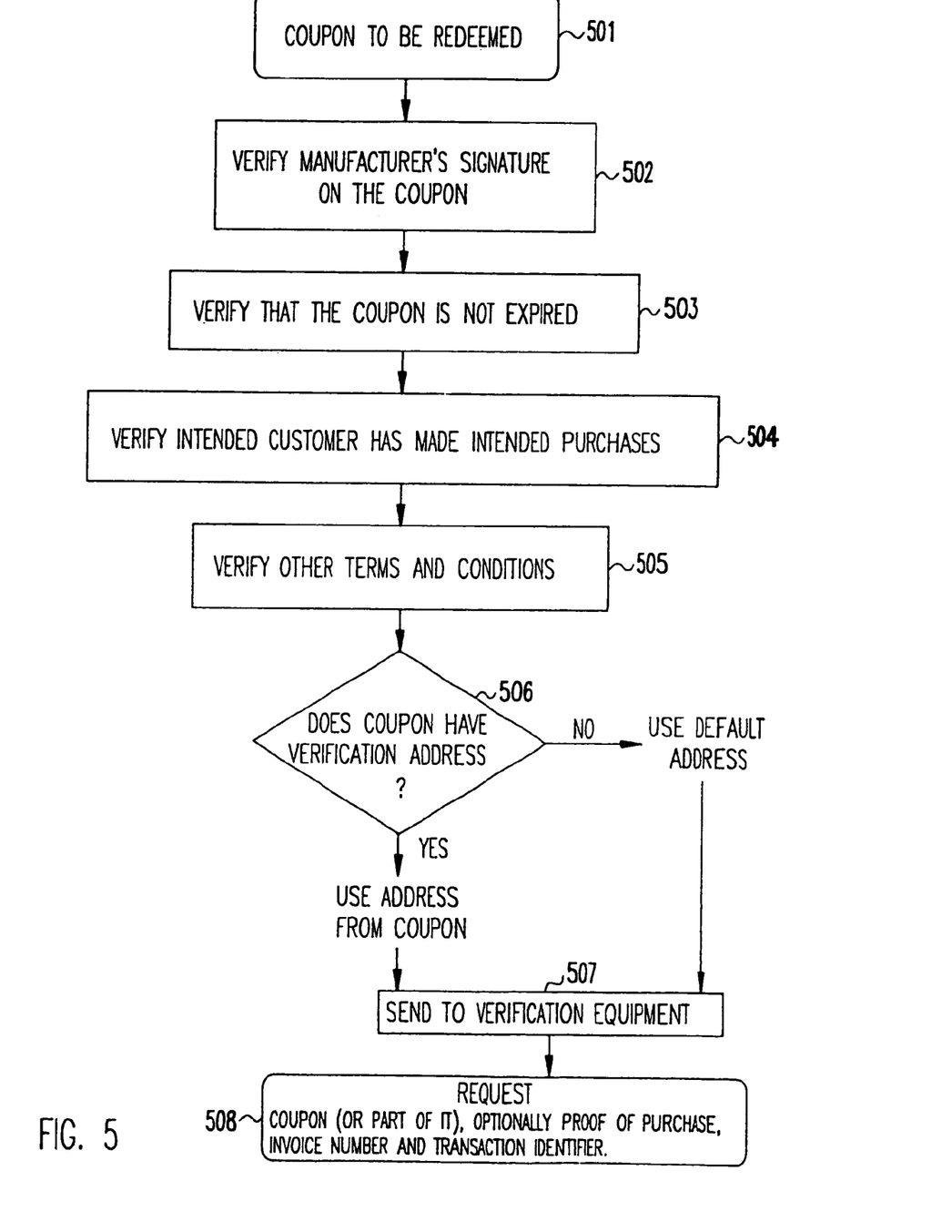
FIG. 5 is a flow diagram showing the logic of a computer implementation of the verification equipment.

When the customer redeems a coupon, it must be verified. The preferred implementation of the verification equipment is computer software as shown in FIG. 5. The coupon to be redeemed in input at input block 501. The manufacturer's digital signature is verified in function block 502. Then the coupon is checked for conditions. A verification is made that the coupon has not expired in function block 503. A verification is made that the intended customer has made the intended purchases in function block 504. Finally, a verification is made that other terms and conditions have been met in function block 505. If all the verifications have been met, a determination is made in decision block 506 to determine if the coupon has a verification address. If so, the address on the coupon is used; otherwise, a default address is used. The coupon is then sent to verification equipment at the determined or default address in function block 507. The request output in block 508 is in the form of the coupon, or part of it, optionally proof of purchase, an invoice number and a transaction identifier.

Returning to FIG. 3, the request is received at the coupon mint at input block 307. The request is routed in block 302 to decision block 303, where this time a determination is made that the request is not for blank coupons. Therefore, a further test is made in decision block 308 to determine if the request is for coupon verification. If so, a test is made in decision block 309 to determine if the coupon presented for verification was issued by the mint. If not, the coupon is declared invalid; otherwise, a further test is made in decision block 310 to determine if the coupon has been used more than a specified number of times. If so, the coupon is declared invalid; otherwise, the local database is updated in function block 311, and then the mint issues a certificate of use to the requester in function block 312. The certificate of use may optionally contain a time of issuing the coupon, a random number, number of coupons with the same class already redeemed and other information.

While the invention has been described in terms of several preferred embodiments, those skilled in the art will recognize that the invention can be practiced with modification within the spirit and scope of the appended claims.

The invention claimed is:

1. A method for generating, distributing, storing, redeeming, validating and clearing electronic manufacturer coupons and electronic store coupons comprising the steps of:
   requesting by a manufacturer or promoter of a product or service or agent thereof that a coupon mint generate a number of coupons;
   generating by the coupon mint unforgable electronic blank coupons in response to said request from the manufacturer/promoter/agent, each said unforgable electronic blank coupon having the property that at a later stage it may be recognized as a valid coupon produced by the mint;
   customizing the generated blank coupons by a manufacturer/promoter/agent of an offer by writing terms and conditions and other details of the offer on the generated blank coupons;
   digitally signing the customized coupons by the manufacturer/promoter/agent;
   distributing the signed customized coupons to potential customers;
   optionally presenting by a customer the signed customized coupons electronically for redemption to an online store or printing the signed customized coupons and presenting them to a conventional offline store;
   checking by a store prior to accepting a coupon for redemption the authenticity of the coupon to verify the digital signature and also verify if the coupon was produced by the mint and has not been used earlier, said checking being done by contacting a verification center, said verification center verifying that the coupon to be redeemed is authentic and also verifying that the coupon was produced by the mint and has not already been used before; and
   collecting by the store all redeemed coupons and sending the redeemed coupons to the manufacturer/promoter/agent for clearing.

2. The method for generating, distributing, storing, redeeming, validating and clearing electronic manufacturer coupons and electronic store coupons recited in claim 1, wherein the unforgable blank coupon includes of a unique identifier for the coupon, a class identifier if supplied by the manufacturer, a cryptographic pattern derived from the class identifier and the unique identifier for the coupon.

3. The method for generating, distributing, storing, redeeming, validating and clearing electronic manufacturer coupons and electronic store coupons recited in claim 2, wherein an unforgable blank coupon comprises a stream of bytes and has the properties that when the coupon is presented to the mint at a later stage, the mint can recognize that the coupon was produced by the mint, and that no other entity can produce such a stream of bytes that will be recognized by the mint as a valid coupon, within a reasonable probability.

4. The method for generating, distributing, storing, redeeming, validating and clearing electronic manufacturer coupons and electronic store coupons recited in claim 2, wherein the manufacturer upon receiving a required number of unforgable blank electronic coupons from the coupon mint, writes offer specific information on a blank coupon and digitally signs the coupon to make it an authentic certificate, the offer specific information including information describing some discounted product or service, information describing the amount of discount offered, and optional validity periods.

5. The method for generating, distributing, storing, redeeming, validating and clearing electronic manufacturer coupons and electronic store coupons recited in claim 1, wherein the terms and conditions of the customized coupons include an offer requiring the customer to collect a set of coupons satisfying a specified condition.

6. The method for generating, distributing, storing, redeeming, validating and clearing electronic manufacturer coupons and electronic store coupons recited in claim 5, wherein the offer is applicable only if the customer presents a set of coupons satisfying the specified condition.

7. The method for generating, distributing, storing, redeeming, validating and clearing electronic manufacturer coupons and electronic store coupons recited in claim 6, wherein each coupon contains some loyalty points and the offer given when a customer presents coupons totaling a specified number.

8. The method for generating, distributing, storing, redeeming, validating and clearing electronic manufacturer coupons and electronic store coupons recited in claim 6, wherein each coupon contains a letter of English alphabet and the offer is given when a customer presents coupons making a specified-word.

9. The method for generating, distributing, storing, redeeming, validating and clearing electronic manufacturer coupons and electronic store coupons recited in claim 6, wherein each coupon contains a picture and the customer is required to collect a certain number of combination of pictures.

10. The method for generating, distributing, storing, redeeming, validating and clearing electronic manufacturer coupons and electronic store coupons recited in claim 1, wherein the terms and conditions of the customized coupons include an offer requiring the customer to purchase "k" out of "n" listed products or services, where $k \leq n$.

11. The method for generating, distributing, storing, redeeming, validating and clearing electronic manufacturer coupons and electronic store coupons recited in claim 1, wherein the customization information consists of information describing an intended recipient of the product or the service.

12. The method for generating, distributing, storing, redeeming, validating and clearing electronic manufacturer coupons and electronic store coupons recited in claim 11, wherein the information describing the intended recipient is optionally recorded as a hash function on the coupon.

13. The method for generating, distributing, storing, redeeming, validating and clearing electronic manufacturer coupons and electronic store coupons recited in claim 11, wherein the information describing the intended recipient describes a class of recipients.

14. The method for generating, distributing, storing, redeeming, validating and clearing electronic manufacturer coupons and electronic store coupons recited in claim 11, wherein the customization information describing the intended recipient of the product or the service further limits the validity of the coupon to the described intended recipient.

15. The method for generating, distributing, storing, redeeming, validating and clearing electronic manufacturer coupons and electronic store coupons recited in claim 11, wherein the customization information further includes a description of the offer in an electronic document format.

16. The method for generating, distributing, storing, redeeming, validating and clearing electronic manufacturer coupons and electronic store coupons recited in claim 1, wherein the step of distributing is performed by a distribution agent which distributes the coupons electronically.

17. The method for generating, distributing, storing, redeeming, validating and clearing electronic manufacturer coupons and electronic store coupons recited in claim 16, wherein the distribution agent distributes the coupons in response to some predetermined event.

18. The method for generating, distributing, storing, redeeming, validating and clearing electronic manufacturer coupons and electronic store coupons recited in claim 16, further comprising the step of making a customized coupon for a customer and presenting it to the customer by the distribution agent, the coupon may, at the customer's option, be used immediately or stored for future use.

19. The method for generating, distributing, storing, redeeming, validating and clearing electronic manufacturer coupons and electronic store coupons recited in claim 18, wherein coupons stored for future use are stored in an electronic "wallet" in the form of digital memory.

20. The method for generating, distributing, storing, redeeming, validating and clearing electronic manufacturer coupons and electronic store coupons recited in claim 19, wherein the electronic "wallet" resides on a customer's computer.

21. The method for generating, distributing, storing, redeeming, validating and clearing electronic manufacturer coupons and electronic store coupons recited in claim 19, wherein the electronic "wallet" resides in memory managed by a third party.

22. The method for generating, distributing, storing, redeeming, validating and clearing electronic manufacturer coupons and electronic store coupons recited in claim 1, wherein the step of distributing is performed by a distribution agent which distributes the coupons by a mass distribution method.

23. The method for generating, distributing, storing, redeeming, validating and clearing electronic manufacturer coupons and electronic store coupons recited in claim 1, wherein the step of verifying is performed on verification equipment controlled by a retailer which verifies the authenticity of the coupon.

24. The method for generating, distributing, storing, redeeming, validating and clearing electronic manufacturer coupons and electronic store coupons recited in claim 23, wherein the verification equipment obtains a "certificate of use", comprising the steps of:
  verifying the digital signature on the coupon;
  checking if the terms of the offer are valid;
  sending at least a part of the coupon to a verification center; and
  issuing by the verification center a "certificate of use" corresponding to a coupon sent.

25. The method for generating, distributing, storing, redeeming, validating and clearing electronic manufacturer coupons and electronic store coupons recited in claim 1, wherein the step of verifying is performed by a coupon verification center which accepts a blank coupon or portions of a customized coupon and performs the steps of:
  determining if the coupon was issued by the coupon mint; and
  determining if the coupon has not already been redeemed.

26. The method for generating, distributing, storing, redeeming, validating and clearing electronic manufacturer coupons and electronic store coupons recited in claim 1, wherein a customer navigates the world wide web using an electronic device which has a display device and an input device, and the step of distributing is performed by a distribution agent residing on a web site and presents the customer a potential offer based on the customer's profile and promotion policies, which offer is displayed on the display device.

27. The method for generating, distributing, storing, redeeming, validating and clearing electronic manufacturer coupons and electronic store coupons recited in claim 26, wherein the customer obtains electronic coupons by making a printout of the coupons, using printing device attached to the electronic device, the printed coupon contains information in the form of machine readable codes, and wherein the customer then physically takes the printed coupon to a retailer where coupon verification equipment reads the information and offers the intended discount to the customer if all the conditions are satisfied.

28. The method for generating, distributing, storing, redeeming, validating and clearing electronic manufacturer coupons and electronic store coupons recited in claim 26, wherein the customer obtains electronic coupons by downloading the electronic coupons in a portable device and takes the portable device to a retailer where coupon verification equipment reads the electronic coupon from the portable device and checks the validity of the coupon, and if the coupon is valid, the retailer gives the intended discount to the customer.

29. The method for generating, distributing, storing, redeeming, validating and clearing electronic manufacturer coupons and electronic store coupons recited in claim 1, further comprising the step of electronically storing the coupons by the customer.

30. The method for generating, distributing, storing, redeeming, validating and clearing electronic manufacturer coupons and electronic store coupons recited in claim 29, wherein after selecting a desired item from an electronic market place, the customer electronically presents a stored coupon for redemption.

31. The method for generating, distributing, storing, redeeming, validating and clearing electronic manufacturer coupons and electronic store coupons recited in claim 1, further comprising the step of writing by the coupon mint verification instructions on the blank coupon before issuing the coupon to customization equipment.

32. The method for generating, distributing, storing, redeeming, validating and clearing electronic manufacturer coupons and electronic store coupons recited in claim 31, wherein the verification instructions include an address, medium and protocols to carry out online verification of a coupon.

33. The method for generating, distributing, storing, redeeming, validating and clearing electronic manufacturer coupons and electronic store coupons recited in claim 32, wherein the address is a Uniform Resource Locator (URL), the medium is the Internet, and the protocol is an Internet Protocol.

34. The method for generating, distributing, storing, redeeming, validating and clearing electronic manufacturer coupons and electronic store coupons recited in claim 1, wherein the step of customization of coupons is performed by the steps of:
   writing information by the manufacturer/promoter/agent information concerning an offer on the coupon and signs it using its private key; and
   writing by a distribution agent other customized information like part of the personalized information on the coupon and digitally signs it using its private key, whereby verification equipment checks all the digital signatures in the step of verifying.

35. The method for generating, distributing, storing, redeeming, validating and clearing electronic manufacturer coupons and electronic store coupons recited in claim 34, wherein the step of verifying includes the step of returning by the verification center a certificate of authenticity generated by verification equipment.

36. The method for generating, distributing, storing, redeeming, validating and clearing electronic manufacturer coupons and electronic store coupons recited in claim 35, wherein the certificate of authenticity contains information as to a number of coupons of the class already redeemed.

37. The method for generating, distributing, storing, redeeming, validating and clearing electronic manufacturer coupons and electronic store coupons recited in claim 35, wherein the certificate of authenticity contains information as to a number of times the coupon has already been redeemed.

38. The method for generating, distributing, storing, redeeming, validating and clearing electronic manufacturer coupons and electronic store coupons recited in claim 1, wherein the coupons are "early bird coupons", discount information in the coupon containing a number "m" and a discount amount, only the first "m" coupons of this class being redeemable.

39. The method for generating, distributing, storing, redeeming, validating and clearing electronic manufacturer coupons and electronic store coupons recited in claim 1, wherein the coupons are "multiple times redeemable coupons", discount information in the coupon containing a number "m" and discount amount, the number "m" indicating that this coupon can be redeemed up to "m" times and the discount amount being applicable only if the number of times the coupon has been redeemed is less than or equal to the number "m".

40. The method for generating, distributing, storing, redeeming, validating and clearing electronic manufacturer coupons and electronic store coupons recited in claim 1, wherein the coupons are "aging coupons", discount information in the coupon depending on a time at which the coupon was redeemed.

41. The method for generating, distributing, storing, redeeming, validating and clearing electronic manufacturer coupons and electronic store coupons recited in claim 1, wherein the coupons are "random value coupons" having a discount amount that depends on a random number that can come from the coupon itself or an external source, the random number being used to compute a discount amount for the coupon.

42. The method for generating, distributing, storing, redeeming, validating and clearing electronic manufacturer coupons and electronic store coupons recited in claim 1, further comprising the step of maintaining a database by the manufacturer of redeemed coupons to build customer profiles for future targeting.

43. The method for generating, distributing, storing, redeeming, validating and clearing electronic manufacturer coupons and electronic store coupons recited in claim 1, wherein a clearing house receives redeemed coupons from one or more stores for one or more manufacturers, further comprising the steps of:
   vexing the authenticity and corresponding certificates of use of redeemed coupons by the clearing house; and
   sorting verified redeemed coupons by the clearing house and providing notification to the manufacturers of amounts to be transferred to stores.

44. The method for generating, distributing, storing, redeeming, validating and clearing electronic manufacturer coupons and electronic store coupons recited in claim 1, wherein the steps of issuing unforgable blank coupons, distributing, providing wallet management and clearing are performed by a common service provider.

45. The method for generating, distributing, storing, redeeming, validating and clearing electronic manufacturer coupons and electronic store coupons recited in claim 1, further comprising the step of encrypting messages exchanged between a customer, the manufacturer, the coupon mint, the store and the verification center.

\* \* \* \* \*

Disclaimer

7,013,286 — Alok Aggarwal, Chappaqua, NY (US); Rahul Garg, Ghaziabad (IN); Parul Alok Mittal, New Delhi (IN); and Natwar Modani, Jaipur (IN). GENERATION, DISTRIBUTION, STORAGE, REDEMPTION, VALIDATION AND CLEARING OF ELECTRONIC COUPONS. Patent dated March 14, 2006. Disclaimer filed October 06, 2006, by the assignee, International Business Machines Corporation.

Hereby completely disclaims all of the claims of said patent.

*(Official Gazette November 25, 2008)*